United States Patent
Wilms et al.

(10) Patent No.: US 8,141,198 B2
(45) Date of Patent: Mar. 27, 2012

(54) WINDSCREEN WIPER ARM

(75) Inventors: Christian Wilms, Koersel-Beringen (BE); Hubert Verelst, Tienen (BE); Marcello Bubba, Haverlee (BE)

(73) Assignee: Robert Bosch GmbH, Stuttgart (DE)

( * ) Notice: Subject to any disclaimer, the term of this patent is extended or adjusted under 35 U.S.C. 154(b) by 866 days.

(21) Appl. No.: 12/064,876

(22) PCT Filed: Sep. 19, 2006

(86) PCT No.: PCT/EP2006/066502
§ 371 (c)(1), (2), (4) Date: Feb. 26, 2008

(87) PCT Pub. No.: WO2007/042377
PCT Pub. Date: Apr. 19, 2007

(65) Prior Publication Data
US 2008/0209662 A1  Sep. 4, 2008

(30) Foreign Application Priority Data

Oct. 10, 2005 (DE) .......................... 10 2005 048 344

(51) Int. Cl.
*B60S 1/32* (2006.01)
*B60S 1/34* (2006.01)
(52) U.S. Cl. ............................. 15/250.351; 15/250.352
(58) Field of Classification Search ............. 15/250.351, 15/250.45, 250.23, 250.34, 250.27, 250.4, 15/250.41
See application file for complete search history.

(56) References Cited

U.S. PATENT DOCUMENTS

| | | | | |
|---|---|---|---|---|
| 2,493,527 A | * | 1/1950 | Carey | 15/250.34 |
| 3,387,316 A | * | 6/1968 | Pearse | 15/250.351 |
| 3,832,751 A | * | 9/1974 | Ursel et al. | 15/250.23 |
| 3,999,278 A | * | 12/1976 | Loskill | 29/450 |
| 5,363,531 A | * | 11/1994 | Chevrier et al. | 15/250.04 |
| 5,819,363 A | | 10/1998 | Siegel et al. | |
| 6,374,451 B1 | * | 4/2002 | Kalbas et al. | 15/250.23 |
| 7,644,483 B2 | | 1/2010 | Thomar et al. | |
| 7,748,076 B2 | | 7/2010 | Weiler et al. | |
| 2006/0162115 A1 | | 7/2006 | Weiler et al. | |

FOREIGN PATENT DOCUMENTS

| | | |
|---|---|---|
| DE | 10259479 | 7/2004 |
| WO | 2004054858 A1 | 7/2004 |
| WO | 2004054860 A1 | 7/2004 |

OTHER PUBLICATIONS

PCT/EP2006/066502 International Search Report.

* cited by examiner

*Primary Examiner* — Gary Graham
*Assistant Examiner* — Michael Jennings
(74) *Attorney, Agent, or Firm* — Michael Best & Friedrich LLP

(57) ABSTRACT

The invention relates to a windscreen wiper arm (10) comprising a wiper bar (40), to which a wiper blade (6) can be attached with or without a spoiler. Said bar is composed of a freely projecting, first arc-shaped wiper bar section (1) with a first curvature variation, to which the wiper blade (6) is attached and of at least one second arc-shaped wiper bar section (2) with a second arc-shaped curvature variation, which adjoins the first wiper bar section (1), to form a snap-off point (12).

20 Claims, 4 Drawing Sheets

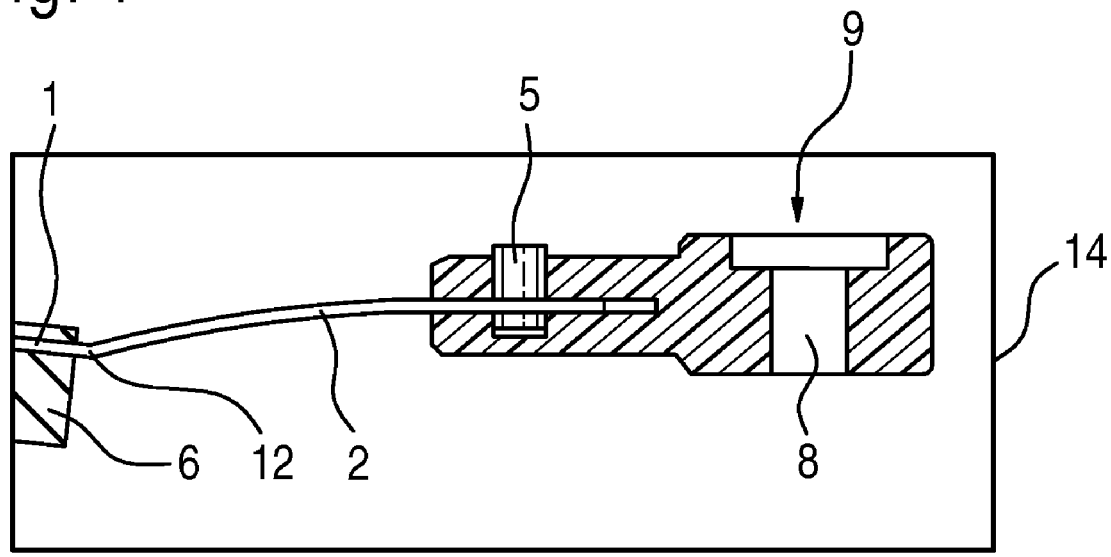
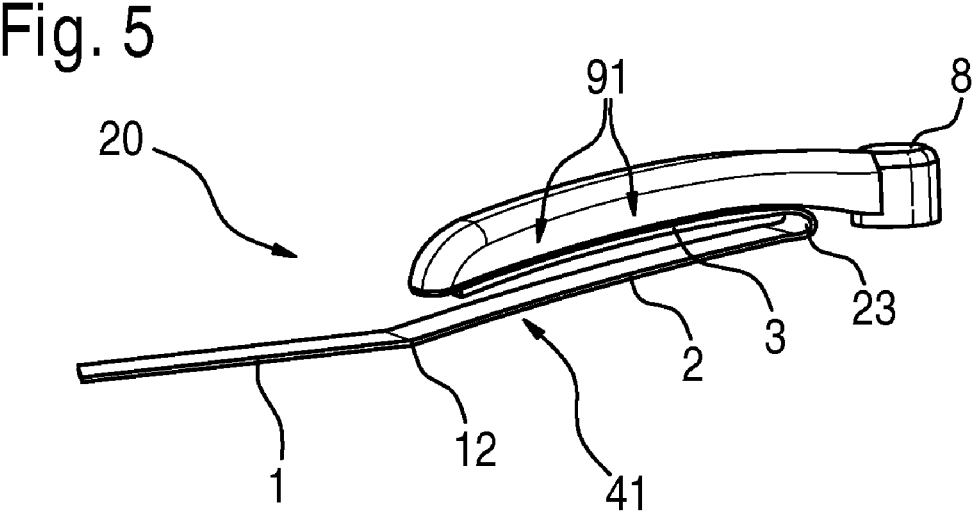

WINDSCREEN WIPER ARM

BACKGROUND OF THE INVENTION

The invention relates to a windshield wiper arm with a wiper rod for attaching a wiper blade with or without a spoiler.

Known windshield wipers for vehicle windows have a windshield wiper arm, which is constructed of a fastening part and an articulated part that is attached thereto via a hinged joint with a wiper rod. A wiper blade element is also coupled to the wiper rod, in that the free end of the wiper rod engages in a joint connecting piece on the wiper blade element. The so formed joint guides the wiper blade element with a presetable application force during the swivel movement of the windshield wiper over the vehicle window. In this case, the wiper blade element has in particular a complex holding device for its rubber profile element. A spring wiper arm that is constructed in this manner can be too expensive for many circumstances.

SUMMARY OF THE INVENTION

The objective of the invention is simplifying a windshield wiper arm of the type mentioned at the outset with respect to its construction while extensively retaining function. This objective is attained by a windshield wiper arm of the type mentioned at the outset in that the wiper rod is comprised of a freely projecting, first arc-shaped wiper rod section with a first curvature progression, to which the wiper blade with or without a spoiler can be attached, and of at least one second arc-shaped wiper rod section with a second curvature progression, which adjoins the first wiper rod section to form a flexion point.

Because the wiper rod is comprised of a freely projecting, first arc-shaped wiper rod section with a first curvature progression, to which the wiper blade with or without a spoiler can be attached, and of at least one second arc-shaped wiper rod section with a second curvature progression, which adjoins the first wiper rod section to form a flexion point, a hinge-free wiper rod is made available, which nevertheless can be pressed resiliently against a vehicle window with sufficiently great application force during the swivel movement of the windshield wiper arm. Because of the second wiper rod section with the flexion point in the transition area to the first wiper rod section of the windshield wiper arm in accordance with the invention, despite the lack of true joint, sufficiently great application pressure force, as with a wiper rod having a joint, can be exerted on the vehicle window in swivel operation. Due to the lack of a joint and the fact that the wiper rod is a single piece, weight can also be saved, i.e., the windshield wiper arm can be manufactured in a lightweight construction. Since, as a result, the windshield wiper arm has so few components, it can be manufactured cost-effectively and quickly in large numbers of units. Due to the one-piece embodiment of the wiper rod, it is largely insensitive to mechanical stress. In addition, its bearing holder is simplified. Further, it is possible in a simpler manner to mount and detach the windshield wiper arm having the reduced number of components on the respective swivel mechanism of a vehicle. In particular, the assembly or putting together of the fastening part, hinged joint, articulated part, wiper rod and connecting piece on the wiper arm, as would be required with a conventional windshield wiper arm, is eliminated. Instead it now advantageously suffices that the windshield wiper arm in accordance with the invention is composed of the one-piece wiper rod arm having the first and the at least second wiper rod sections and an exchangeable connecting element for coupling to a swivel mechanism, in particular a motor drive. In this case, the actual wiper blade is embodied particularly as a rubber profile element and pre-mounted on the first wiper rod section in an expedient manner, or it can be exchangeably attached there in an advantageous manner. In this case, a spoiler or wind deflector can also be provided in an advantageous manner on the rubber profile element of the wiper blade.

Furthermore, the windshield wiper arm in accordance with the invention can be constructed in an advantageous manner with a narrower silhouette than a traditional windshield wiper arm with a joint between its wiper blade element and wiper arm. The wiper blade can be attached more narrowly on the first arc-shaped wiper rod section, so that only a narrow wiper strip is visible to the driver of a motor vehicle. As a result, the field of vision of the driver of a motor vehicle is less impaired during wiper movement of the windshield wiper arm in accordance with the invention over the front window or rear window of the motor vehicle. In addition, the styling of the windshield wiper arm is improved.

Moreover, the aerodynamics of the windshield wiper arm in accordance with the invention are also improved. Undesired lifting movements of the wiper blade element from the vehicle window due to lifting movements of the wiper blade element on the joint connecting piece of the wiper rod, e.g., due to the air stream, are now no longer possible because of the single-piece nature of the windshield wiper arm in accordance with the invention. As a result, particularly the jerky or rattling effects of conventional spring wiper arms are largely avoided. Negative aerodynamic interference, such as may occur between the wiper blade element and the spoiler of a conventional spring wiper arm, is also avoided. In addition, water spray effects and water streaking, which can be caused with a conventional spring wiper arm by the previous connecting joint between the wiper blade element and the wiper rod, also disappear. Since, in the case of the windshield wiper arm in accordance with the invention, there are no so-called "interrupting elements" like the connecting piece in a conventional spring wiper arm, interference to or diverting of the water path beneath the wiper blade is largely avoided during its wiping movement over the vehicle window being wiped. Large-scale distribution of the water over the vehicle window, which purposefully accumulates, i.e., is wiped together, with the wiper blade along its swivel movement over the vehicle window, is thereby largely avoided.

BRIEF DESCRIPTION OF THE DRAWINGS

The invention and its developments are explained in more detail in the following on the basis of the drawings.

The drawings show.

DETAILED SUMMARY

Elements having the same function and operation are always provided with the same reference numbers in FIGS. 1 through 5.

Figure 1:
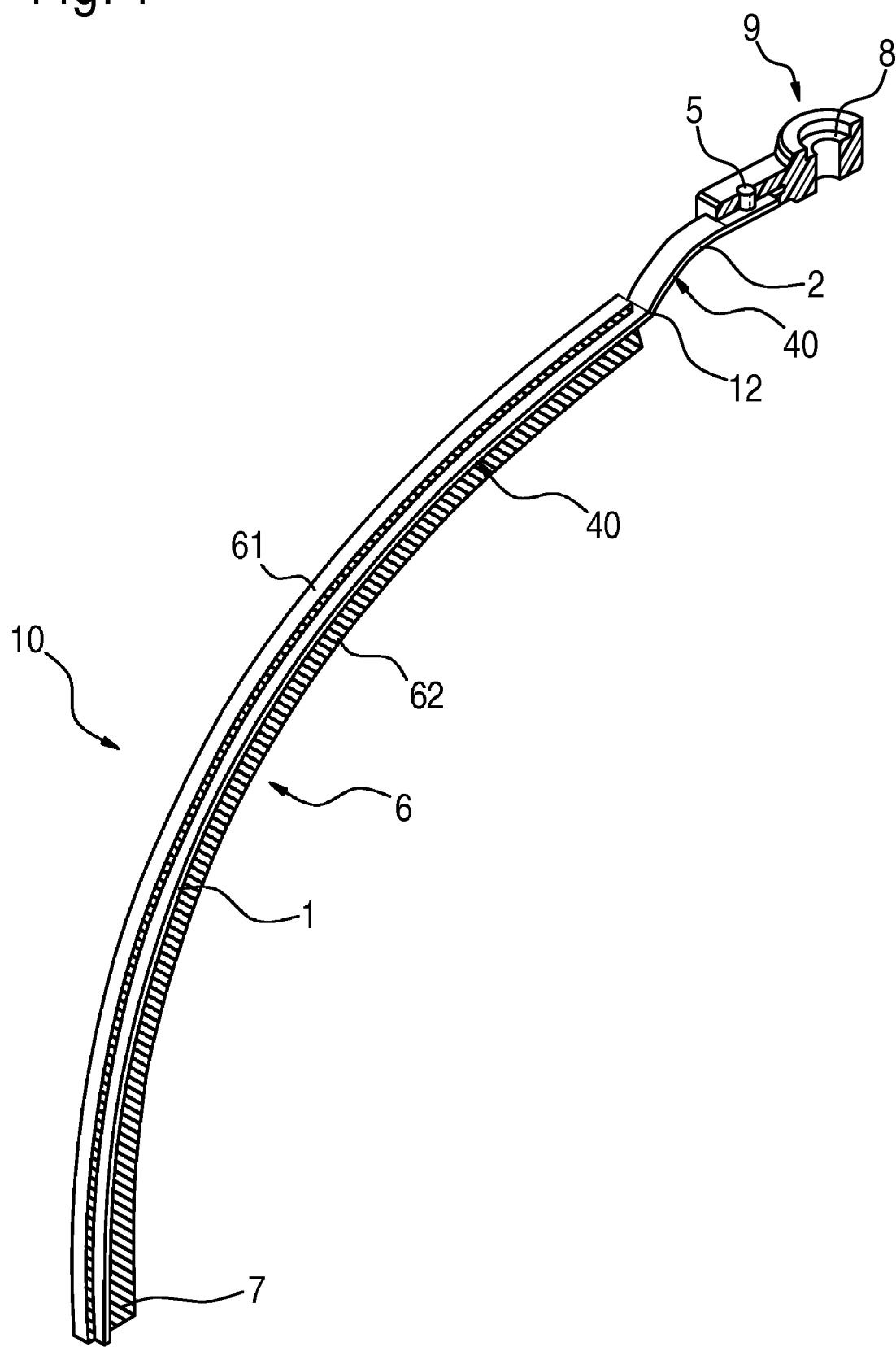
FIG. 1 A schematic in a perspective representation of a first exemplary embodiment of a windshield wiper arm constructed in accordance with the invention in an unstressed state, FIG. 2 A schematic side view of the profile of the first windshield wiper arm from FIG. 1, FIG. 3 A schematic side view of the first windshield wiper arm from FIG. 2 in an applied state on the vehicle window, FIG. 4 A detail of the schematic side view of the connecting element of the first windshield wiper arm for coupling to a swivel mechanism, FIG. 5 A schematic side view of a partial section of a second windshield wiper arm in an applied state on a vehicle window, which is modified as compared to the first windshield wiper arm from FIG. 1 along with 4 with respect to its suspension and coupling mechanism to a swivel mechanism.
Figure 2:
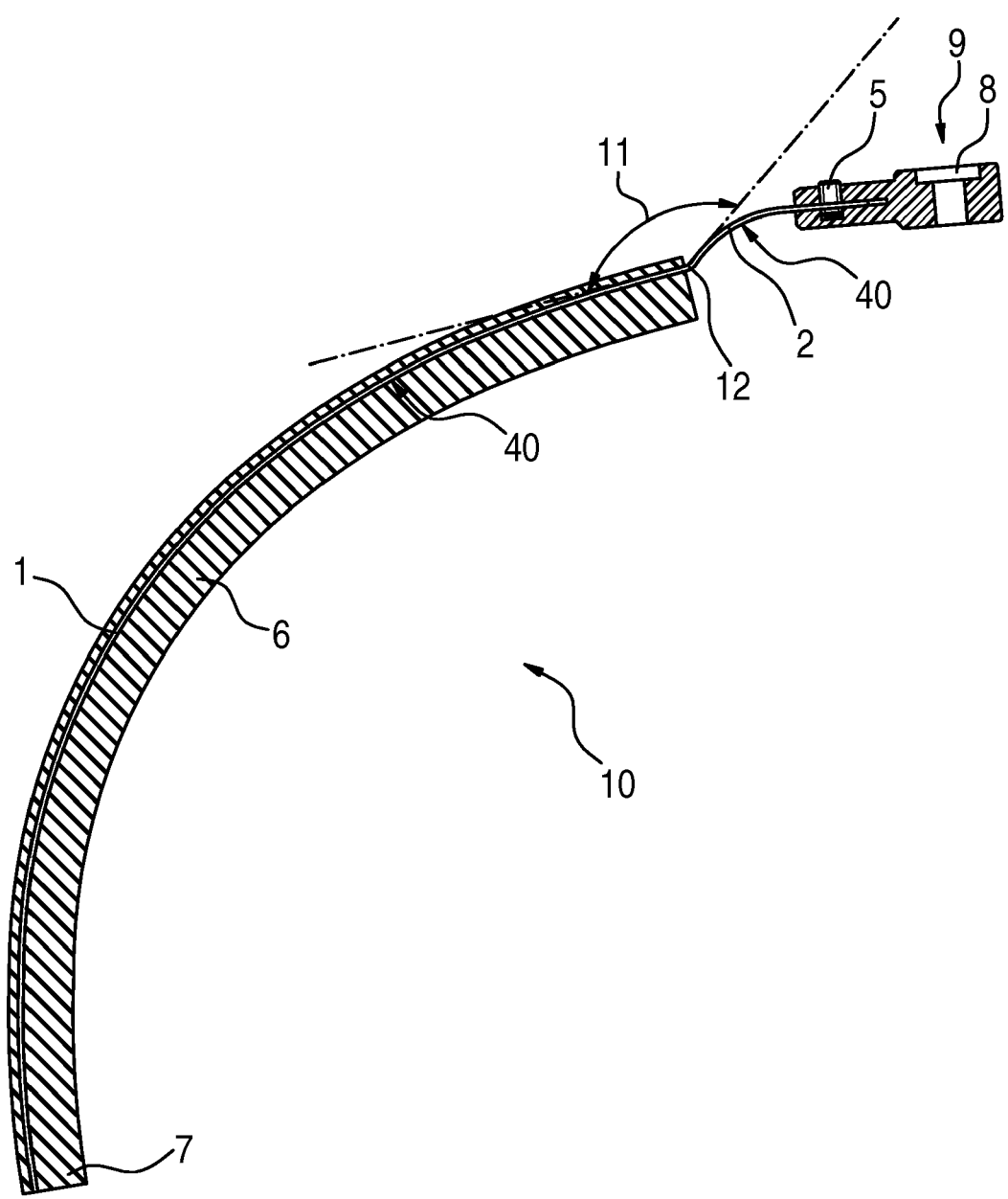
Figure 3:
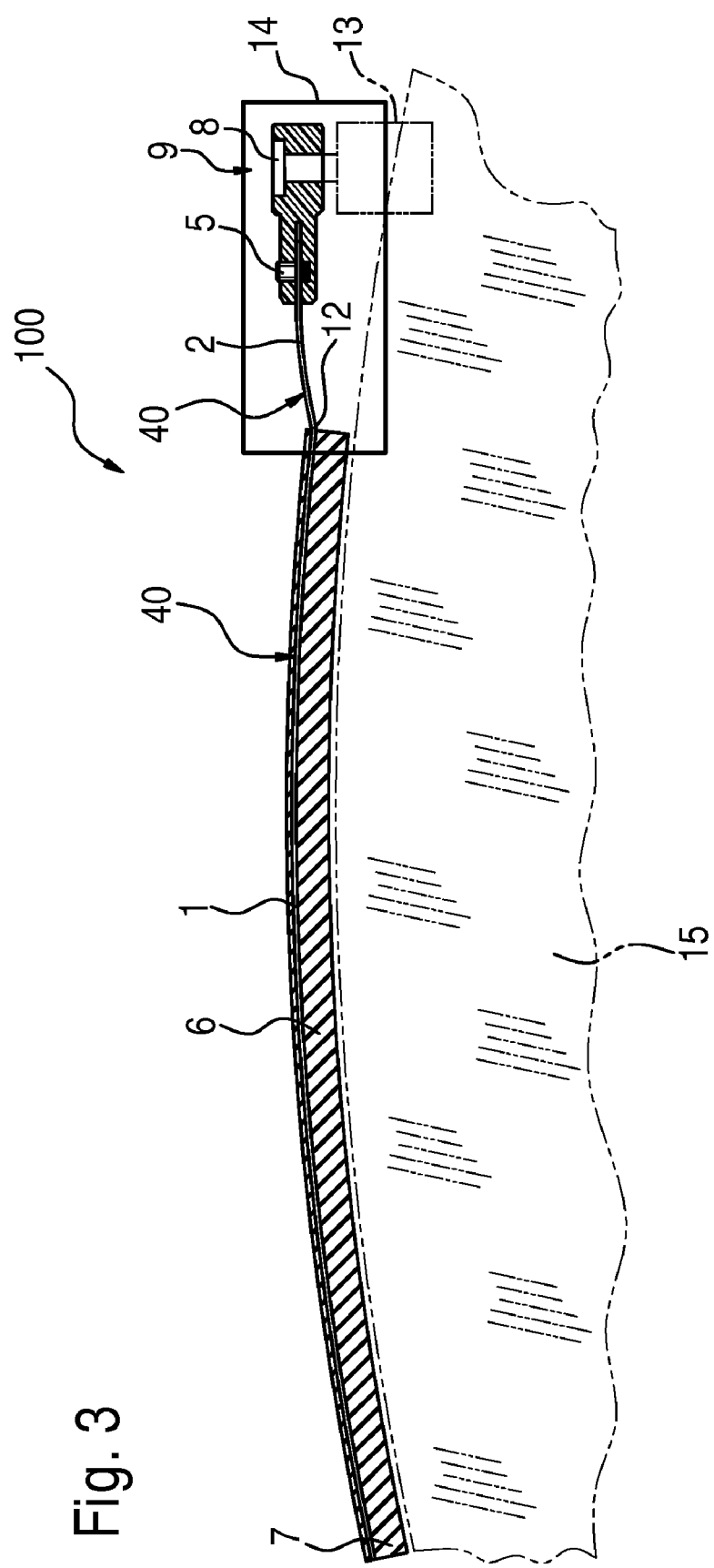

FIG. 1 schematically depicts a perspective representation of a first windshield wiper arm 10, which is constructed in accordance with the structural principle of the invention, in a relaxed state before assembly on a swivel or drive mechanism 13. FIG. 2 schematically depicts a side view of this windshield wiper arm 10. FIG. 3 schematically depicts a side view of the first windshield wiper arm 10 from FIG. 2 in an applied state on a vehicle window 15 after assembly on the swivel mechanism 13. It is designated there in a mounted state as 100. It features an elongated, one-piece wiper rod 40, on whose freely projecting first wiper rod section 1 a wiper blade 6 for wiping a window, particularly a vehicle window, is attached. The wiper blade 6 in this case is formed in particular by a rubber profile element. The wiper rod 40 is comprised of the freely projecting, first arc-shaped wiper rod section 1 with a first, largely continuous curvature progression, on which the wiper blade 6 can be attached, and of at least a second, arc-shaped wiper rod section 2 with a second, largely continuous curvature progression, which adjoins the first wiper rod section 1 to form a flexion point 12. The first and second arc-shaped wiper rod sections 1, 2 are preferably formed by at least a bending process or stamping process from a one-piece metal band that originally runs in a straight line. Of course, the two wiper rod sections that are linked as a single piece can also be manufactured by a support strip of another suitable material, e.g., plastic or carbon, using corresponding molding processes.

Each wiper rod section 1, 2 viewed by itself is essentially continuously bent. The rubber profile element of the wiper blade 6 is clamped on along one longitudinal edge side of the strip-like or band-like profile of the first wiper rod section 1. In particular, one of two longitudinal edges of the first wiper rod section 1 runs in a longitudinal groove of the rubber profile element. In this case, the rubber profile element clasps one part of the upper side of the first wiper rod section 1 with its upper profile strip 61. It projects downward on the lower side of the first wiper rod element 1 with a wiper edge or ridge 62 that runs essentially perpendicular to its upper side, and said edge is positioned on a vehicle window 15 (see FIG. 3) for wiping after assembly of the windshield wiper arm 10. The wiper blade 6 can preferably be mounted exchangeably or replaceably on the first wiper rod section 1. Of course, a fixed fastening of the wiper blade on the wiper rod is also possible as an alternative.

In addition, if necessary it can be expedient to attach a spoiler to the upper side of the first wiper rod section 1.

In order to make first wiper rod section 1 resilient, i.e., so that, during windshield wiper operation, it presses with a presettable application pressure force on the vehicle window 15, the second arc-shaped wiper rod section 2 with the second curvature progression is attached to the first arc-shaped wiper rod section 1 with a presettable first curvature progression via a flexion point 12. The flexion point 12 in this case forms a sort of discontinuity point with respect to the continuous curvature progression of the first and second wiper rod sections 1, 2. In particular, in this case the curvature progression of the first wiper rod section 1 varies from the curvature progression of the second wiper rod section 2. However, in the exemplary embodiment shown in FIG. 1 the second arc-shaped wiper rod section 2 features the same sense of curvature as the first arc-shaped wiper rod section, because they are each convexly curved or pre-bent. Specifically, the first arc-shaped wiper rod section 1 has a larger radial radius of curvature in the area of its freely projecting end 7 than in the area of the flexion point 12. For the second arc-shaped wiper rod section 2, a smaller radial radius of curvature is provided in the area of the flexion point 12 than in the area of its end, which is used for coupling to a swivel mechanism 13 (see FIG. 3). In the area of the flexion point or the discontinuous transition zone 12, the tangential extension of the first arc-shaped wiper rod section 1 and the tangential extension of the second arc-shaped wiper rod section 2 expediently enclose an angle 11 of between 90° and 180°, particularly of approx. 150°, as viewed from the side opposite from the wiping edge or the wiping ridge 62 of the wiper blade 6. The first arc-shaped wiper rod section 1 is embodied to be longer along its curvature progression, in particular between 100 mm and 10,000 mm longer, than the second arc-shaped wiper rod section 2 along its curvature progression.

A connecting element 9 can be attached, preferably exchangeably, on the end of the second wiper rod section opposite from the free end 7 of the wiper rod 40, with which the wiper rod 40 can be coupled to a swivel mechanism 13. FIG. 4 shows this connecting element 9 on the second wiper rod section 2 as a detail of the windshield wiper arm 10 in FIG. 3. This detail is made evident in this connection in FIGS. 3 and 4 by a border labeled with reference number 14.

On the end section of the second wiper rod section 2, the connecting element 9 has an insertion element, particularly a bolt element 5, that engages in an associated bore hole on the second wiper rod section 2 and locks into place there. At the same time, it grips around one of the two longitudinal edges of the second wiper rod section 2 along a partial length from the front side end. It is provided with a longitudinal groove for this purpose. In particular, the connecting element 9 is attached to the end section of the second wiper rod section 2 so that it can be exchanged, i.e., replaced, manually. It is preferably fastened to the second wiper rod section 2 with the aid of a so-called "click system."

In addition, the connecting element features a fixing element 8, with which the free end of the second wiper rod section 2 can be connected to the swivel mechanism 13, in particular a motor drive. The fixing element 8 can be formed for example by a sleeve-like profile element, which can be inserted with frictional engagement on a conical shank on the drive shaft of the swivel mechanism 13 and locked there in particular with the assistance of a bolt or a screw. The insertion mechanism can be embodied expediently such that the windshield wiper arm 10 can be pulled off or detached manually after the bolt or screw has been loosened so that exchange or replacement with a new windshield wiper arm is possible without a problem.

Viewed as a whole, the first windshield wiper arm is therefore comprised only of a one-piece wiper rod with first and second arc-shaped wiper rod sections, which feature a flexion point between them, a wiper blade attached on the freely projecting first wiper rod section, in particular a rubber profile section with or without a spoiler, and a connecting element on the end section of the second wiper rod element. As a result, a completely hinge-free windshield wiper arm is made available, which nevertheless can be pressed resiliently against a vehicle window with sufficiently great application force during its swivel movement. Because of the second wiper rod section with the flexion point in the transition area to the first wiper rod section of the windshield wiper arm in accordance with the invention, despite the lack of true joint, sufficiently great application pressure force, as with a conventional wiper rod having a joint, can be exerted on the vehicle window in swivel operation. Due to the lack of a joint and the fact that the wiper rod of the windshield wiper arm in accordance with the invention is a single piece, weight can also be saved, i.e., the windshield wiper arm can be manufactured in a lightweight construction. Since, as a result, the windshield wiper arm has so few components, it can be manufactured cost-effectively and quickly in large numbers of units. Due to the one-piece embodiment of the wiper rod, it is largely insensitive to mechanical stress. In addition, its bearing holder is simplified. Further, it is possible in a simpler manner to mount and detach the windshield wiper arm having the reduced number of components on the respective swivel mechanism of a vehicle. In particular, the assembly or putting together of the fastening part, hinged joint, articulated part, wiper rod and connecting piece on the wiper arm, as would be required with a conventional windshield wiper arm, is eliminated. Instead it now advantageously suffices that the windshield wiper arm in accordance with the invention is composed of the one-piece wiper rod arm having the first and the at least second wiper rod sections and an exchangeable connecting element for coupling to a swivel mechanism, in particular a motor drive. In this case, the actual wiper blade, particularly a rubber profile element with or without a spoiler, is pre-mounted on the first wiper rod section in an expedient manner, or it can be exchangeably attached there in an advantageous manner.

FIG. 5 shows a partial section of a second windshield wiper arm 20, which is modified as compared to the first windshield wiper arm 10 from FIG. 1 along with 4. In contrast to the first windshield wiper arm 10, the second windshield wiper arm 20 has a wiper rod 41, which is bent back for a partial length on the connecting end of its second wiper rod section 2. This bent-back, one-sided, partial section of the second wiper rod section is also continuously bent and designated by 3 in FIG. 5. It is arranged above the positional plane of the second wiper rod section 2. Its intended projection in the positional plane of the second wiper rod section 2 essentially runs congruent to said second arc-shaped wiper rod section. In the relaxed pre-mounted state, the bent-back end section 3 of the second wiper rod section 2 is bent back with respect to said second wiper rod section by an angle of between 0 and 60°, in particular by 20°. In a mounted state when pressed against the vehicle window, the bent-back end section 3 is preferably pressed resiliently in the direction of the second wiper rod section 2 in such a way that both enclose an angle of approx. 180°. This mounted state is depicted in FIG. 5. In this case, the bent-back end section 3 lies in a layer plane above the positional plane of the second arc-shaped wiper rod section 2 essentially congruent to its end-side progression section. In other words, it runs there essentially with the same curvature progression as the second wiper rod section 2. A flexion point 23 is formed between the second wiper rod section 2 and its bent-back end section 3. As a result, viewed as a whole, a modified wiper rod 41 is made available, which is comprised of three related arc-shaped wiper rod sections, 1, 2, 3, wherein one flexion point or discontinuity point respectively lies between each two neighboring, i.e., successive, wiper rod sections.

Alternatively, the bent-back end section 3 can naturally be provided in a layer plane below of the second wiper rod section 2.

The bent-back end section 3 and the second wiper rod section 2 in this case form a two-spoke dual spring system, i.e., a double rocker arm, which permits a resilient suspension of the wiper rod 41 on the drive unit.

The modified wiper rod 41 is preferably manufactured in corresponding bending and/or stamping steps from a metal band or metal strip that originally runs essentially in a straight line.

In contrast to the first windshield wiper arm 10, in the exemplary embodiment in FIG. 5, a connecting element 91 is now attached exchangeably to the bent-back end section 3, i.e., to the third wiper rod section 3. It preferably features a so-called "click mechanism" for coupling to the third wiper rod section 3. For assembly to the swivel mechanism 13, particularly the drive unit, the locking mechanism 8 is embodied to be manually exchangeable in particular, in accordance with the fixing agent of the first windshield wiper arm 10.

In this way, the third wiper rod section 3 acts on the connecting element 91 to the swivel mechanism 13 in the manner of a spring rocker arm for the wiper blade 6 on the freely projecting, first wiper rod section 1. As a result, vibrations and angle variations in the swivel movements of the windshield wiper arm 20 can be largely equalized, particularly absorbed. As a result, in particular undesirable jerky effects of the wiper blade 6 of the windshield wiper arm 20 when it is gliding over the vehicle window (such as 15 in FIG. 3 for example) can be avoided to a large extend.

As an alternative to manufacturing by bending and/or stamping from a metal band, the respective wiper rod can also be manufactured of a resilient plastic material or an otherwise suitable material. When using plastic, the respective wiper rod can be manufactured in particular via a standard plastic injection process.

In addition, it can also be expedient, if necessary, to construct the wiper rod in such a way that in general it has more than two arc-shaped wiper rod sections, which are placed successively in the longitudinal direction and each of which is adjacent to a flexion point.

The invention claimed is:

1. Windshield wiper arm (10) having a wiper arm for attaching a wiper blade (6) with or without a spoiler, characterized in that, the wiper rod (41) is comprised of a freely projecting, first arc-shaped wiper rod section (1) with a first curvature progression, to which the wiper blade (6) is attachable, and of at least one second arc-shaped wiper rod section (2) curved along its length with a second arc-shaped curvature progression, which directly adjoins the first wiper rod section (1) to form a first flexion point (12), characterized in that, the second arc-shaped wiper rod section (2) is bent back on one side into a bent back arc-shaped wiper rod section (3) as a two-spoke dual spring system, in which, in an applied state of the wiper arm, the bent-back wiper rod section (3) is curved along its length and runs in a layer plane above or below a positional plane of the second arc-shaped wiper rod section (2) essentially congruent to the second arc-shaped wiper rod section (2) as well as with approximately the same curvature progression as said second wiper rod section along a presentable longitudinal section, a tangential extension of the first arc-shaped wiper rod section (1) and a tangential extension of the second arc-shaped wiper rod section (2) enclose an angle (11) of between 90° and 180°, in area of the flexion point (12) as viewed from a side opposite from a wiping edge of the wiper blade (6).

2. Windshield wiper arm according to claim 1, characterized in that, the first and second arc-shaped wiper rod sections (1, 2) are formed by at least a bending process or stamping process from a one-piece metal band that originally runs in a straight line.

3. Windshield wiper arm according to claim 2, characterized in that, the second arc-shaped wiper rod section (2) features the same sense of curvature as the first arc-shaped wiper rod section (1).

4. Windshield wiper arm according to claim 3, characterized in that, the first arc-shaped wiper rod section (1) as well as the second arc-shaped wiper rod section (2) are each convexly curved.

5. Windshield wiper arm according to claim 4, characterized in that, the first arc-shaped wiper rod section (1) has a larger radial radius of curvature in an area of a freely projecting end (7) than in an area of the flexion point (12).

6. Windshield wiper arm according to claim 5, characterized in that, the second arc-shaped wiper rod section (2) has a smaller radial radius of curvature in an area of the flexion point (12) than in an area of its opposite end.

7. Windshield wiper arm according to claim 6, characterized in that, the tangential extension of the first arc-shaped wiper rod section (1) and the tangential extension of the second arc-shaped wiper rod section (2) enclose an angle (11) of approximately 150° in the area of the flexion point (12) as viewed from a side opposite from the wiping edge of the wiper blade (6).

8. Windshield wiper arm according to claim 7, characterized in that, the first arc-shaped wiper rod section (1) is embodied to be between 100 mm and 10,000 mm longer along its curvature progression, than the second arc-shaped wiper rod section (2) along its curvature progression.

9. Windshield wiper arm according to claim 8, characterized in that, the wiper rod (41) has an end opposite from the freely projecting end, and in that, a connecting element (91) is attached exchangeable on the end opposite from the freely projecting end (7) of the wiper rod (41), with which the wiper rod (41) is couplable to a swivel mechanism (13).

10. Windshield wiper arm according to claim 9, characterized in that, the connecting element (91) is attachable in a resilient manner to the bent-back wiper rod section (3) of the two-spoke dual spring system.

11. Windshield wiper arm according to claim 1, characterized in that, the second arc-shaped wiper rod section (2) features the same sense of curvature as the first arc-shaped wiper rod section (1).

12. Windshield wiper arm according to claim 11, characterized in that, the first arc-shaped wiper rod section (1) as well as the second arc-shaped wiper rod section (2) are each convexly curved.

13. Windshield wiper arm according to claim 1, characterized in that, the first arc-shaped wiper rod section (1) has a larger radial radius of curvature in an area of its freely projecting end (7) than in the area of the flexion point (12).

14. Windshield wiper arm according to claim 1, characterized in that, the second arc-shaped wiper rod section (2) has a smaller radial radius of curvature in the area of the flexion point (12) than in the area of its opposite end.

15. Windshield wiper arm according to claim 1, characterized in that, the first arc-shaped wiper rod section (1) is embodied to be longer along its curvature progression, than the second arc-shaped wiper rod section (2) along its curvature progression.

16. Windshield wiper arm according to claim 1, characterized in that, the wiper rod (41) has a free end and an end opposite from the free end, and that, a connecting element (91) is attached exchangeably on the end opposite from the free end (7) of the wiper rod (41), with which the wiper rod (41) is couplable to a swivel mechanism (13).

17. Windshield wiper arm according to claim 1, characterized in that, a connecting element (91) is attachable in a resilient manner to the bent-back wiper rod section (3) of the two-spoke dual spring system.

18. Windshield wiper arm according to claim 1, characterized in that, the bent-back wiper rod section (3) runs in a layer plane above the positional plane of the second arc-shaped wiper rod section (2).

19. Windshield wiper arm according to claim 1, characterized in that, the second wiper rod section (2) directly adjoins one end of the bent-back wiper rod section (3) to form a second flexion point (23), the bent-back wiper rod section (3) providing a coupling to a swivel mechanism (13).

20. Windshield wiper arm according to claim 19, characterized in that, the coupling to the swivel mechanism (13) is spaced from the second flexion point (23).

* * * * *